US010765907B2

(12) United States Patent
Acquaviva et al.

(10) Patent No.: US 10,765,907 B2
(45) Date of Patent: Sep. 8, 2020

(54) FREE-STANDING BALANCING APPARATUS

(71) Applicant: Everybodies Here LLC, Boston, MA (US)

(72) Inventors: Edna Acquaviva, Boston, MA (US); Cody Miles Wojcik, Fremont, NH (US)

(73) Assignee: Everybodies Here LLC, Boston, MA (US)

( * ) Notice: Subject to any disclaimer, the term of this patent is extended or adjusted under 35 U.S.C. 154(b) by 141 days.

(21) Appl. No.: 15/891,897

(22) Filed: Feb. 8, 2018

(65) Prior Publication Data

US 2018/0221702 A1  Aug. 9, 2018

Related U.S. Application Data

(60) Provisional application No. 62/456,337, filed on Feb. 8, 2017.

(51) Int. Cl.
*A63B 21/16* (2006.01)
*A61H 3/02* (2006.01)
(Continued)

(52) U.S. Cl.
CPC ........ *A63B 21/16* (2013.01); *A63B 21/00047* (2013.01); *A63B 26/003* (2013.01);
(Continued)

(58) Field of Classification Search
CPC ............... A63B 21/00; A63B 21/0004; A63B 21/00043; A63B 21/00047; A63B 21/0005; A63B 21/00058; A63B 21/00069; A63B 21/00072; A63B 21/00076; A63B 21/00178; A63B 21/00181; A63B 21/002; A63B 21/0023; A63B 21/008; A63B 21/0083; A63B 21/0085; A63B 21/0087; A63B 21/02; A63B 21/021; A63B 21/023; A63B 21/025; A63B 21/026; A63B 21/028; A63B 21/04; A63B 21/0407; A63B 21/0414; A63B 21/0425; A63B 21/0435; A63B 21/0442; A63B 21/045; A63B 21/0455; A63B 21/05; A63B 21/065; A63B 21/068; A63B 21/08; A63B 21/15; A63B 21/158; A63B 21/159; A63B 21/16; A63B 21/4023; A63B 21/4047; A63B 21/4033; A63B 21/4034; A63B 21/4035; A63B 21/4041; A63B 21/4043; A63B 21/4045;
(Continued)

(56) References Cited

U.S. PATENT DOCUMENTS

| 4,085,763 A * | 4/1978 | Thomas | A45B 7/00 135/69 |
| 9,038,647 B1 * | 5/2015 | Scott | A61H 3/02 135/73 |
| 2010/0234192 A1 * | 9/2010 | Oller, Jr. | A63B 21/00047 482/131 |

* cited by examiner

*Primary Examiner* — Loan B Jimenez
*Assistant Examiner* — Zachary T Moore
(74) *Attorney, Agent, or Firm* — Behmke Innovation Group LLC; James M. Behmke; Jonathon P. Western (57) ABSTRACT

A free-standing balancing apparatus is disclosed, which is useful for providing increased balance, proper support, and variable levels of stability to a user engaged in various types of physical activities. The apparatus comprises an elongated body that is adjustable in height, a handle near the top of the apparatus, and a stabilizing section that can be positioned and configured to contact the exercise surface as needed with varying levels of stabilization. Also disclosed are methods of using the free-standing balancing apparatus.

9 Claims, 8 Drawing Sheets

(51) Int. Cl.
*A63B 21/00* (2006.01)
*A63B 26/00* (2006.01)
*A63B 69/00* (2006.01)

(52) U.S. Cl.
CPC .. *A61H 2003/0272* (2013.01); *A63B 69/0064* (2013.01); *A63B 2225/093* (2013.01)

(58) Field of Classification Search
CPC . A63B 21/4049; A63B 23/02; A63B 23/0205; A63B 23/0211; A63B 23/0216; A63B 23/0222; A63B 23/0227; A63B 23/0233; A63B 23/0238; A63B 23/03508; A63B 23/03516; A63B 23/3525; A63B 23/0355; A63B 23/03575; A63B 23/03583; A63B 23/04; A63B 23/0405; A63B 23/0494; A63B 23/08; A63B 23/0482; A63B 23/085; A63B 23/10; A63B 23/12; A63B 23/1209; A63B 23/1245; A63B 23/1281; A63B 26/003; A63B 26/00; A63B 26/006; A63B 69/00; A63B 69/0064; A63B 71/00; A63B 71/0009; A63B 71/0036; A63B 71/0054; A63B 2071/0063; A63B 2071/0072; A63B 2071/0081; A63B 2071/009; A63B 2071/026; A63B 2208/00; A63B 2208/0204; A63B 2210/00; A63B 2210/50; A63B 2210/54; A63B 2210/58; A63B 2225/09; A63B 2225/0093; A63B 2023/003; A63B 2023/006; A63B 22/0046; A63B 22/20; F16M 11/16; F16M 11/046; A45B 9/02; A61H 2003/0272; A61H 2003/0205; A47B 97/00
USPC .................................................... 135/65, 66
See application file for complete search history.

FREE-STANDING BALANCING APPARATUS

RELATED APPLICATIONS

This application claims priority to U.S. Provisional Application No. 62/456,337, filed Feb. 8, 2017, entitled: "FREE-STANDING BALANCING APPARATUS," by Acquaviva, the contents of which are herein incorporated by reference.

TECHNICAL FIELD

The present disclosure relates generally to a free-standing apparatus to provide balance and stability for a user, particularly during exercising.

BACKGROUND

Devices of various types are available for participants and instructors for use during exercising. For example, aerobic classes often use jump ropes or punching bags, and non-aerobic (strengthening and conditioning) classes may include weights, body bars, and stability and medicine balls. Other forms of equipment can be used, depending on the type of exercise being done.

Furthermore, stabilizing devices should also be available for participants and instructors if needed in order to provide physical support during various activities, and the style and design would depend on the type and difficulty of the exercise, the user's skill level, age, etc. However, very few of these devices are available and, those that do exist are tailored to a specific set of potential users or exercise techniques and cannot be readily adaptable for use by a wide group of participants.

SUMMARY

The present disclosure relates to a free-standing balancing apparatus, particularly for use in a variety of different exercise and fitness classes. The apparatus comprises a handle attached to a central shaft body that is adjustable in height. The apparatus further comprises a stabilizer section comprising a plurality of stabilizers, such as legs, configured to be lowered and positioned into contact with the exercise surface by the user. In some embodiments, the handle is collapsible, fitting against the sides of the shaft body. In addition, in some embodiments, the stabilizer section is configured to enable individual or particular groupings of legs to be positioned to provide varying levels of increased stability.

It is to be understood that the foregoing general description and the following detailed description are exemplary and explanatory only and are intended to provide further explanation of the present disclosure as claimed.

BRIEF DESCRIPTION OF THE DRAWINGS

The foregoing and other objects, features, aspects, and advantages of the embodiments disclosed herein will become more apparent from the following detailed description when taken in conjunction with the following accompanying drawings.

It should be understood that the above-referenced drawings are not necessarily to scale, presenting a somewhat simplified representation of various preferred features illustrative of the basic principle of the disclosure. The specific design features of the present disclosure, including, for example, specific dimensions, orientations, locations, and shapes, will be determined in part by the particular intended application and use environment.

DESCRIPTION OF EXAMPLE EMBODIMENTS

The present disclosure describes an apparatus for providing variable stability levels for a user during exercising.

The balancing apparatus of the present disclosure comprises a shaft body having, at one end, at least one handle and, at the opposite end, a stabilizing section comprising a plurality of stabilizers, such as legs. The apparatus is free-standing in that, when a sufficient number of stabilizers are positioned to be in contact with the exercise surface, the apparatus remains standing upright with no additionally required support.

The apparatus has an elongated body or shaft that, in some embodiments, is adjustable in length. For example, the length of the body may be adjustable from about 30 inches to about 50 inches, although other lengths are also possible. In this way, when the apparatus is upright, the height of the apparatus can be adjusted to suit the user. In particular, the apparatus height may set so that the handle, positioned near the top of the elongated body, will be at the height of a first user's hip and then can be readjusted to be at hip height for a different user, as needed. In this way, the apparatus can be used by people having a wide range of heights. Any known method of length adjustment can be used. For example, the body of the apparatus may include multiple insertable tube sections, such as a first tube section that is at least partly insertable into a second tube section, and may further include one or more locking devices, such as pins or latches, that enable the tubes to move relative to each other when the locking devices are not engaged and prevent tube movement when the locking devices are engaged, thereby locking the sections in position. Specific embodiments are described in more detail below. The cross-sectional and longitudinal shape of the body of the apparatus can also vary, depending, for example, on the overall design, cost, and strength. In some embodiments, the shaft may comprise insertable straight hollow tubes having an annular cross-sectional shape.

The handle of the apparatus is positioned at or near the top of the elongated body, when the apparatus is upright. Any handle type can be used and may include grips as needed for better comfort and control. In some embodiments, the handle may be a single handle segment, such as a rod or tube that may be inserted perpendicularly into or through the top end of the apparatus body, thereby forming a T-shape. In other embodiments, the handle may comprise two handle segments attached and positioned on opposite sides of the apparatus body. For this embodiment, the handle segments may be fixedly attached, such as by soldering or other attachment means, to provide stationary handles, or may be removable attached, allowing the segments to be taken off, such as for storage or transport. In addition, or alternatively, the handle segments may be movably attached to the apparatus body, such as by a hinge or other device enabling one or both of the handle segments to be collapsed or folded onto the sides of the apparatus body.

The end of the elongated body or shaft opposite the handle is configured to come into contact with the exercise surface, such as a mat or floor. In some embodiments, the elongated body further comprises a cap that fits over or onto the end opposite to the handle (i.e., the bottom end when the apparatus is upright). The cap can be made of any material known in the art, such as rubber or plastic, and is configured to provide protection against damage for both the end of the elongated body as well as for the surface upon which it is used. Furthermore, when the apparatus is in use, the end cap provides some stability for the user by increasing traction and preventing the end from slipping. As such, the cap may have a flat or rounded bottom, with or without treads depending on the desired level of traction.

The free-standing balancing apparatus further comprises a stabilizing section, positioned near the end of the elongate body opposite the handle and movable relative to the apparatus body. The stabilizing section is configured to provide increasing levels of support and stability when in use and comprises one or more stabilizers, such as legs. The stabilizer section can, in various embodiments, be moved relative to the elongate body, such as by a user's foot during an activity, in order to position the stabilizers to be in contact with the exercise surface upon which the apparatus stands, such as a mat or floor.

In some embodiments, the stabilizer section comprises one or more stabilizing legs positioned on a movable ring or plate. The number and positioning of the legs can vary. In a specific embodiment, 3-5 legs may be positioned symmetrically around the ring or plate and around the apparatus body. The stabilizer legs may be fixedly or movably attached anywhere along the ring or plate. For example, a plurality of stationary legs may be positioned on the ring or plate such that, when the apparatus is upright, the legs point towards the floor. The legs may be attached, for example, by soldering or other known methods, or the legs and ring/plate may be of unitary construction. In this configuration, the ring or plate of the stabilizer section can be lowered by sliding down the elongated body until the legs contact the exercise surface (similar in action to a kickstand). In addition, the stabilizer section may be raised and returned to its original position by sliding up the apparatus body. Springs may be used to assist in raising the stabilizer section, if desired.

As another example, the legs may be movably attached to the movable ring or plate such that, as the stabilizer device is slid down the body of the apparatus, the legs may independently be positioned to contact the exercise surface. The movable stabilizers can then be held in place to provide the user with the desired additional stability and support. For this example, the stabilizer legs may be initially positioned to point downward towards the exercise surface and spread outwardly away from the elongate shaft to increase the angle between the leg and shaft, thereby providing greater stability. Alternatively, the stabilizers may be positioned to point upward away from the surface and rotated downward as the stabilizer section is slid down the shaft. In either case, in some embodiments, the stabilizer legs may be folded or collapsed onto the sides of the apparatus body, providing a compact design during use, transportation, or storage.

Locking devices along the apparatus shaft, such as pins or rings, may be used to hold the movable stabilizer section in position along the elongated body, so that the stabilizers do not contact the exercise surface until desired. When a user decides to engage the stabilizers, the locking devices can be released or passed over so that the stabilizer section can be moved downward along the shaft. In addition, once in the lowered stabilizing position, additional locking devices may be used to temporarily prevent the stabilizer section from moving back up the shaft, particularly when downward pressure is applied on the stabilizers during use. When released, the stabilizer section may then be moved upward and returned to its original position further up the elongate shaft.

In other embodiments, the stabilizer section may be fixedly attached to the elongated body of the apparatus and may comprise one or more movable legs that may be positioned to contact the exercise surface. For example, the stabilizer section may comprise one or more stabilizing legs movably attached to a stationary ring or plate. As another example, the stabilizer section may comprise one or more stabilizing legs movably attached to a stationary hinge. For this embodiment, the stabilizing section (for example, the ring, plate, or hinge) may be fixedly attached to the elongated body, such as by soldering or other methods known in the art, with the position of the attachment dependent on both the length and desired angle of the stabilizing legs. Furthermore, the legs may be initially folded or collapsed onto the sides of the elongated body and may be positioned to be pointing either away from or towards the exercise surface. For example, when pointed towards the surface and folded onto the elongated body, the legs may be pulled away from the shaft and lengthened to be in contact with the surface, such as with a telescoping or unfolding design. Also, when pointed away from the surface, the legs may be rotated away from the shaft into contact with the mat or floor.

Figure 1A:
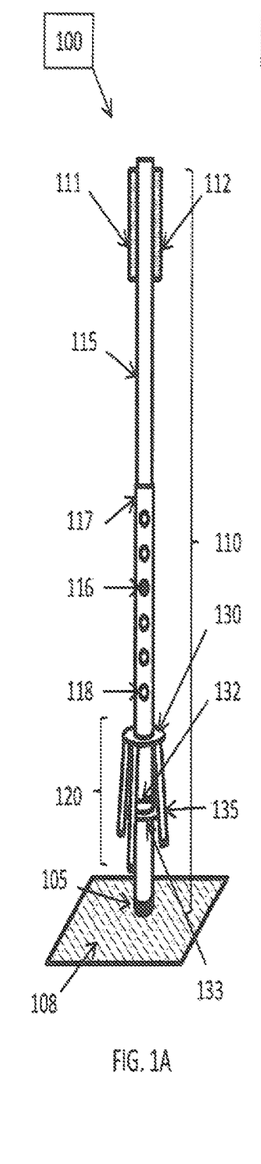
FIGS. 1A-1D are views of an example free-standing balancing apparatus according to various embodiments of the present disclosure.

A specific embodiment of the free-standing balancing apparatus of the present disclosure is shown in FIGS. 1A-1D. In particular, as shown in FIG. 1A, balancing apparatus 100 comprises tubular shaft (shaft body) 110, which includes upper shaft segment 115 inserted into lower shaft segment 117. Upper shaft segment 115 comprises depressible pin 116, and lower shaft segment 117 comprises a plurality of holes 118. As shown, shaft 110 further comprises handles 111 and 112 positioned near the top of the apparatus and cap 105 attached at the bottom of the apparatus in contact with surface 108.

The apparatus further comprises stabilizer section 120 positioned near the bottom of the apparatus. Stabilizer section 120 comprises ring 130 and multiple legs 135 attached to the ring and shown folded onto the sides of lower shaft segment 117. In this specific embodiment, four legs are shown, although fewer or additional legs may be provided, as desired. The handles are also shown folded onto the sides of upper shaft segment 115. In this configuration, the balancing apparatus can be used to provide a low level of added stability to a user, who can place the apparatus within reach, either in front or beside them, and use one or both hands at the top of the apparatus with the bottom of the shaft in contact with the exercise surface to provide support during their exercise or movement.

Figure 1B:
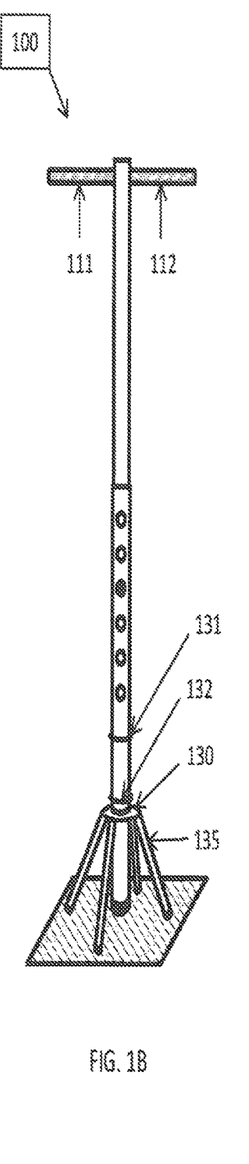
Figure 1C:
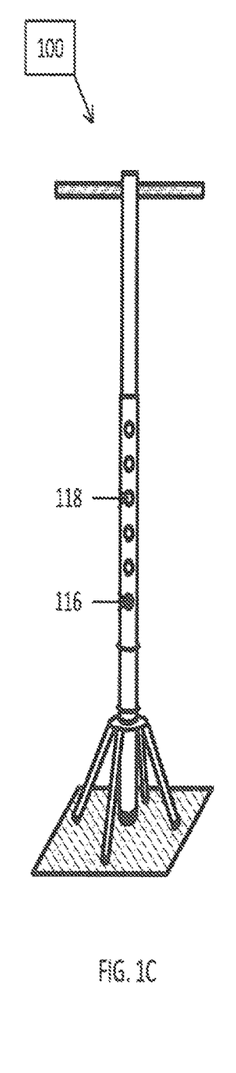
Figure 1D:
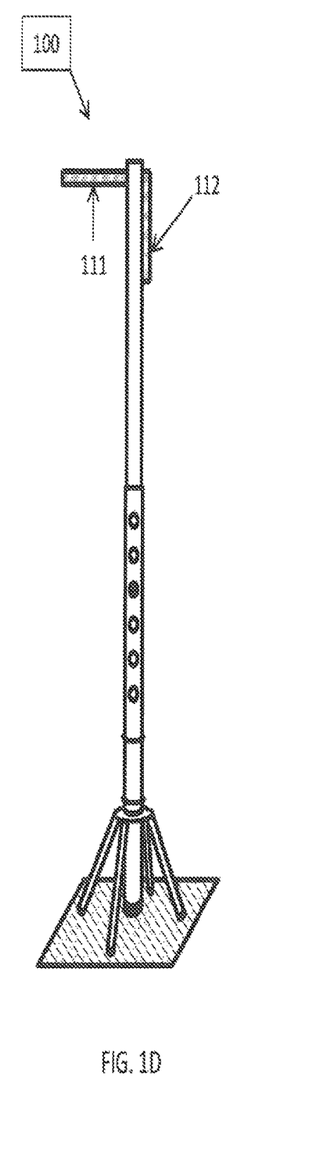

Handles 111 and 112 may be raised or pivoted upwardly into a locked horizontal position to form an overall T-shape, which is shown in FIG. 1B and FIG. 1C. Alternatively, one handle may be raised with the second handle remaining folded against the shaft, as shown in FIG. 1D. Both would provide additional support for the user. For example, with one handle raised, a user may position the apparatus with the raised handle facing them and the apparatus either beside or in front of them in order to gain additional leverage and stability. With both handles up, the user can position the apparatus in front of them, grasping one handle with each hand, with the shaft of the apparatus in the center, increasing stability.

As shown in FIG. 1B, stabilizer section 120 may be moved along shaft 110, particularly along lower shaft segment 117, until the stabilizer legs contact the exercise surface. In particular, ring 130 may be moved, such as with a user's foot, past retaining rings 131 and 132 to rest upon stop 133. Retaining ring 131 can maintain the position of the stabilizer section on the apparatus body, preventing it from unintentionally sliding down the shaft, and retaining ring 132 can prevent the stabilizer section from moving up the shaft under the pressure exerted on it during use. Other methods and techniques can also be used. As shown, legs 135, which are folded along the sides of the lower shaft, may spread open as the stabilizer section slides down the shaft. With all four legs in contact with exercise surface 108, along with cap 105 on the bottom of shaft 110, a high level of stability is provided for a user. Additional legs may also be used to provide even greater overall support.

As shown, the overall height/length of shaft 110 can also be adjusted. For example, upper shaft segment 115 and lower shaft segment 117 may be moved relative to each until depressible pin 116 becomes inserted into one of holes 118, such as in the third hole shown in FIG. 1B. To change the height, the pin can be depressed and the two shaft segments moved until the pin inserts into a different hole, such as the last hole as shown in FIG. 1C. In this way, the height of the handles can be adjusted to suit a particular user, particularly to position the handles at the height of the user's hip.

Figure 2A:
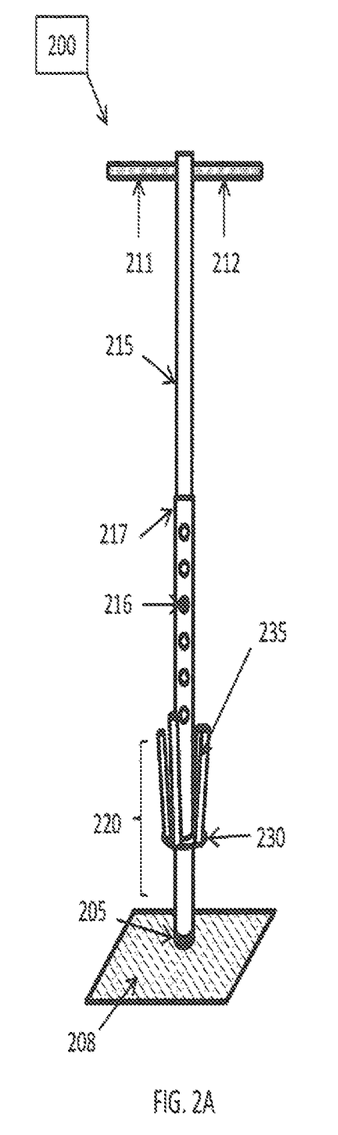
FIGS. 2A-2C are views of another example free-standing balancing apparatus having individually positionable legs, according to various embodiments of the present disclosure.
Figure 2B:
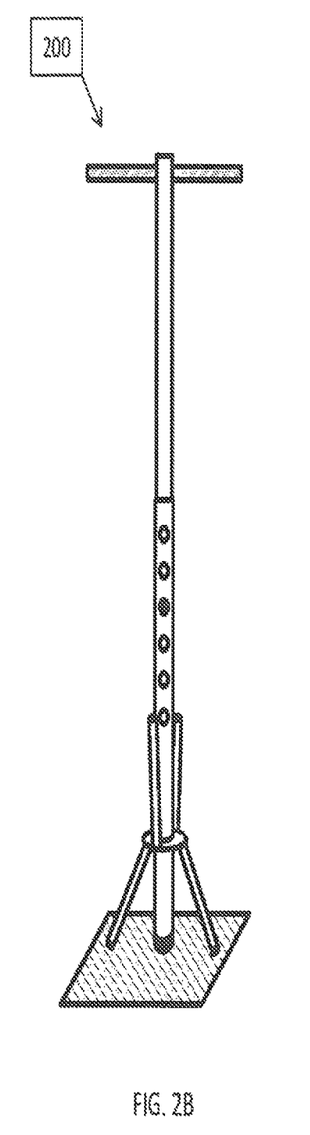
Figure 2C:
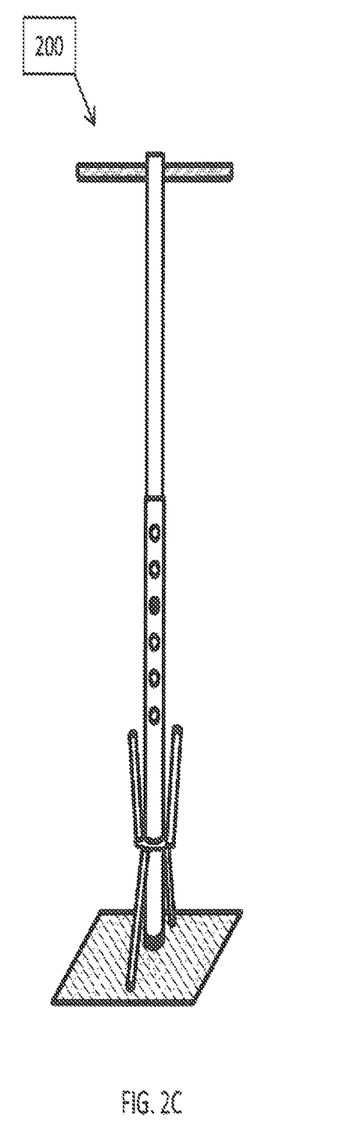

Another specific embodiment of the free-standing balancing apparatus of the present disclosure is shown in FIGS. 2A-2C. In particular, as shown in FIG. 2A, balancing apparatus 200 comprises stabilizing section 220 fixedly attached to lower shaft segment 217. Upper shaft segment 215, with attached handles 211 and 212, is inserted into lower shaft segment 217 at a desired height using depressible pin 216. The stabilizing section includes ring 230 and attached legs 235. In this embodiment, the ring is stationary and the legs are individually movable by rotating the leg downward. Alternatively, legs may be moved in groups, such as two at a time, each on opposite sides of the shaft. Configured in this way, as shown in FIG. 2B, by lowering some of the legs, but not all, to be in contact with surface 208, along with cap 205 of lower shaft assembly 217, an intermediate level of increased stabilization can be provided. Also, stability can be created directionally. For example, with the handles and legs positioned as shown in FIG. 2B, the user may stand the apparatus in front of them, grasp the handles, and have increased support from side to side. With the handles and legs positioned as shown in FIG. 2C, support would be from front to back. Thus, individualized stabilization can be used depending on the activity in which the user is engaged.

Figure 3A:
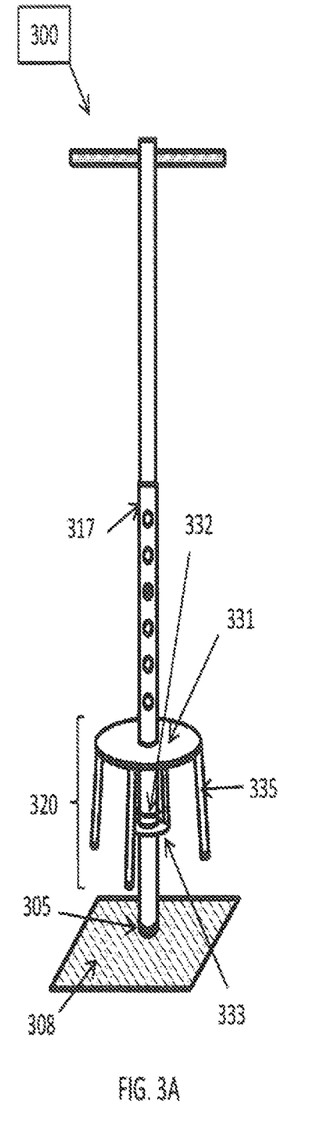
FIGS. 3A-3B are views of another example free-standing balancing apparatus according to various embodiments of the present disclosure.
Figure 3B:
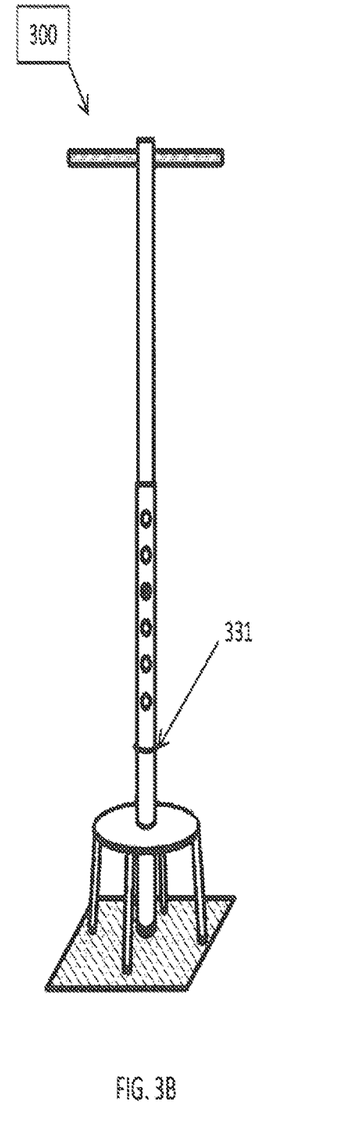

Another specific embodiment of the free-standing balancing apparatus of the present disclosure is shown in FIGS. 3A-3B. In particular, as shown in FIG. 3A, balancing apparatus 300 comprises stabilizing section 320 positioned on lower shaft segment 317. The stabilizing section includes plate 331 and attached legs 335. In this embodiment, the plate is movable along the lower shaft segment, such as past retaining rings 331 and 332 to rest upon stop 333, and the legs are fixedly attached to the plate. Configured in this way, as shown in FIG. 3B, the stabilizing section can be lowered as a complete unit to engage the legs with the exercise surface. Thus, a user can quickly go from a low level of support, with only cap 305 of lower shaft segment 317 in contact with surface 308, to a much higher level of support, with all legs and the center shaft engaged, simply and easily by lowering the stabilizer section, such as with their foot. Raising the stabilizer section can return it back to its original position, which can aided by spring action.

Figure 4A:
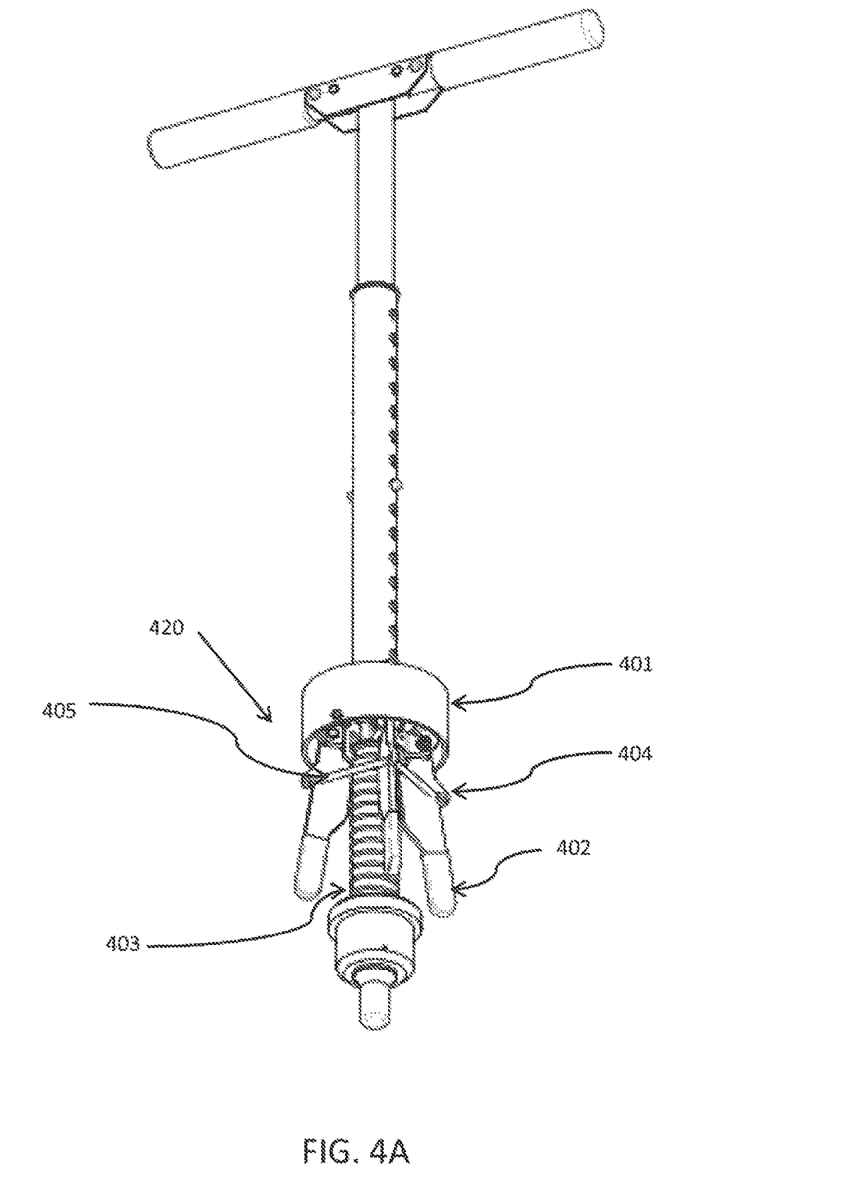
FIGS. 4A-4B are views of another example free-standing balancing apparatus showing an exemplary movement of a stabilizer section.
Figure 4B:
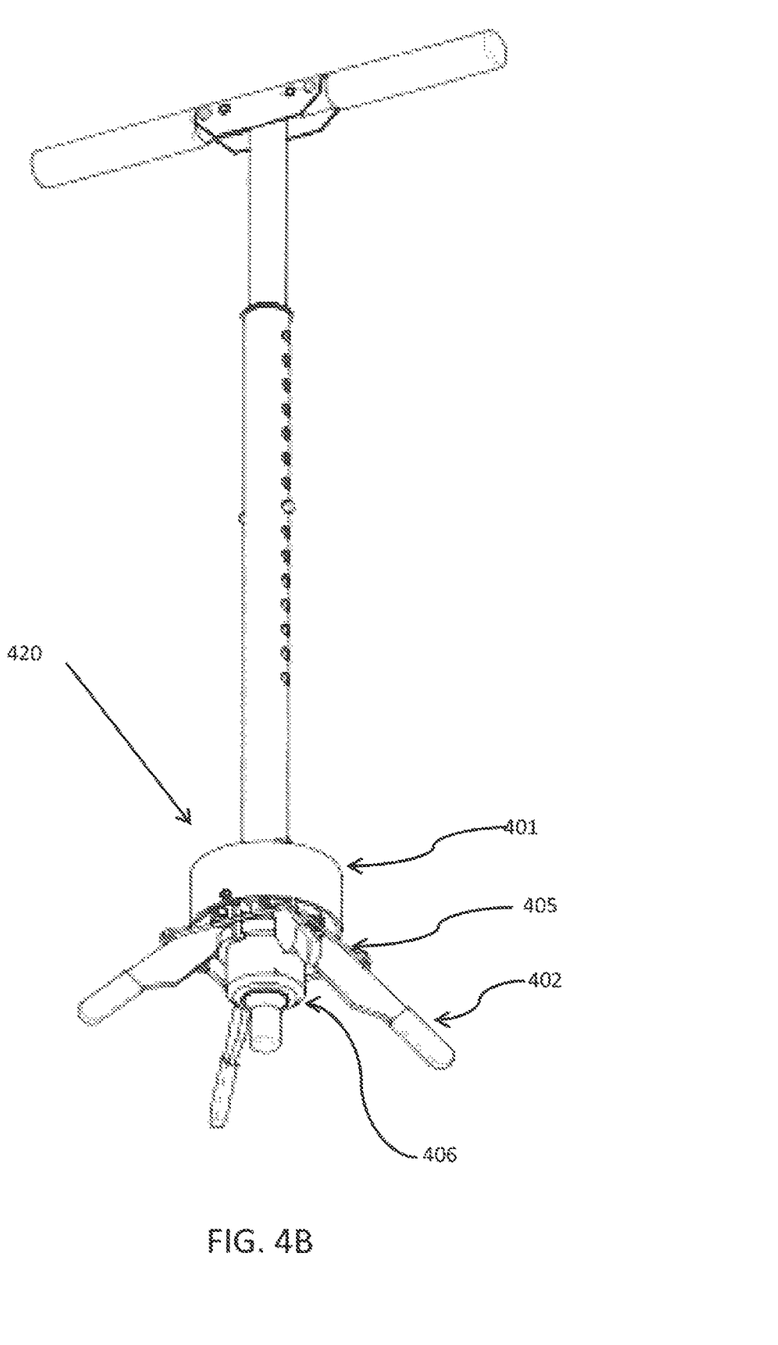

Another specific embodiment of the free-standing balancing apparatus of the present disclosure is shown in FIGS. 4A-4B. In particular, FIGS. 4A-4B illustrate another exemplary stabilizing section 420 in a closed position (FIG. 4A) and an open position (FIG. 4B). The stabilizing section 420 in the exemplary embodiment includes at least a leg cap 401, a plurality of legs 402, a spring mechanism 403, a spring support mechanism 406, a guidance structure 404, and a leg support line structure 405. In particular, the leg cap 401 is movable linearly along the lower shaft between a closed (FIG. 4A) and an open (FIG. 4B) position.

FIG. 4A illustrates the stabilizing section 420 in the closed position where the leg cap 401 is in its upper most position along the lower shaft. In the closed position, the plurality of legs 402 are folded up inside of the leg cap 401 and moved inward toward the lower shaft to a position that is substantially parallel to the lower shaft. FIG. 4B illustrates the stabilizing section 420 in the open position where the leg cap 401 is in its lowest most position along the lower shaft. In the open position, the plurality of legs 402 are angled outward from the leg cap 401 and the lower shaft similarly to what is described above in FIGS. 3A-3C.

Furthermore, in this exemplary embodiment each of the legs 402 include a guidance structure 404 may be structured as hook. The hook allows the support line structure 405 to be disposed around the outer perimeter of the plurality of legs 402 and held in place during movement of the legs to an open position. The support line structure 405 may be, for example, an elastic band, expandable wire, etc. In doing so, the support line structure 405 aids in the movement the legs into the open and closed positions and provides some degree of support to the stability of the plurality of legs 402.

Figure 5A:
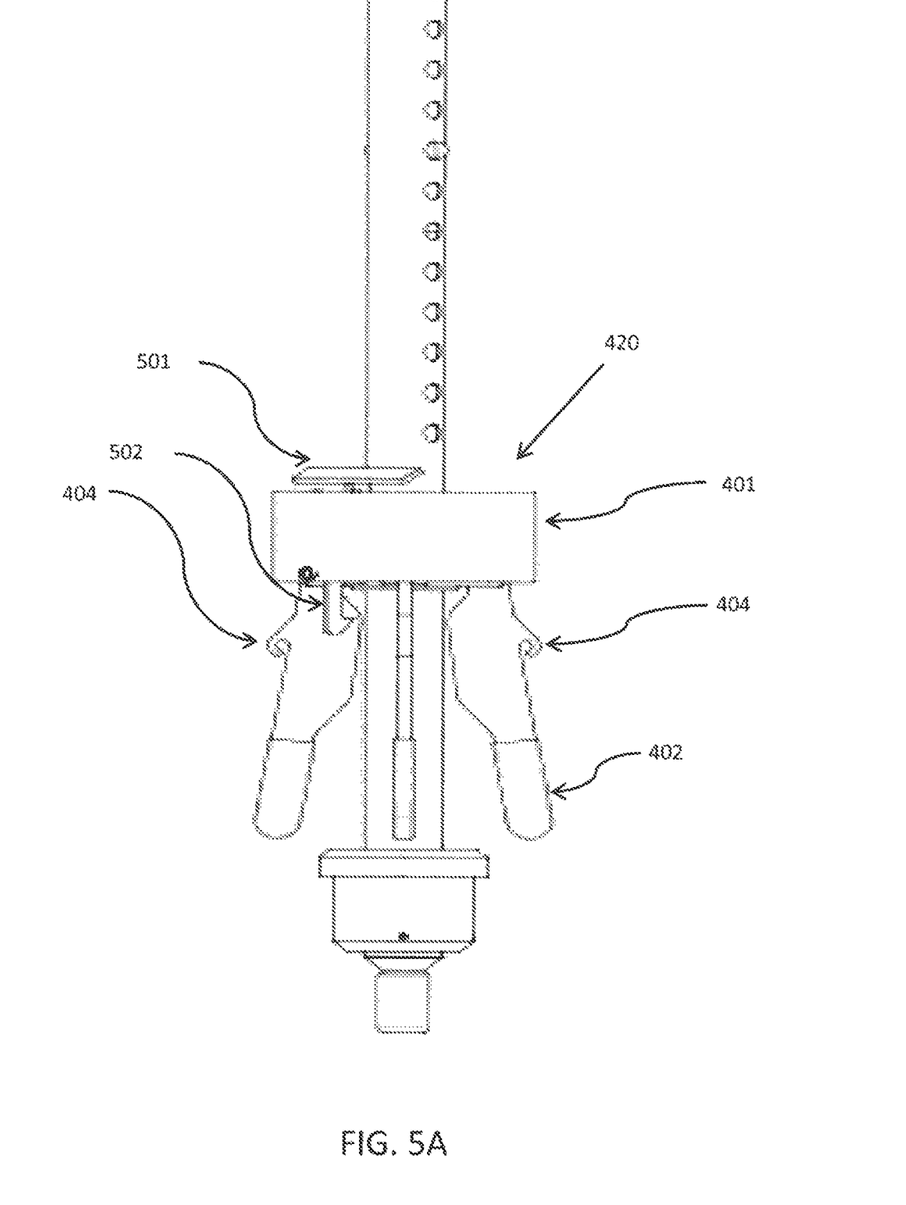
FIGS. 5A-5C are an exploded view of the exemplary movement of the stabilizer section.
Figure 5B:
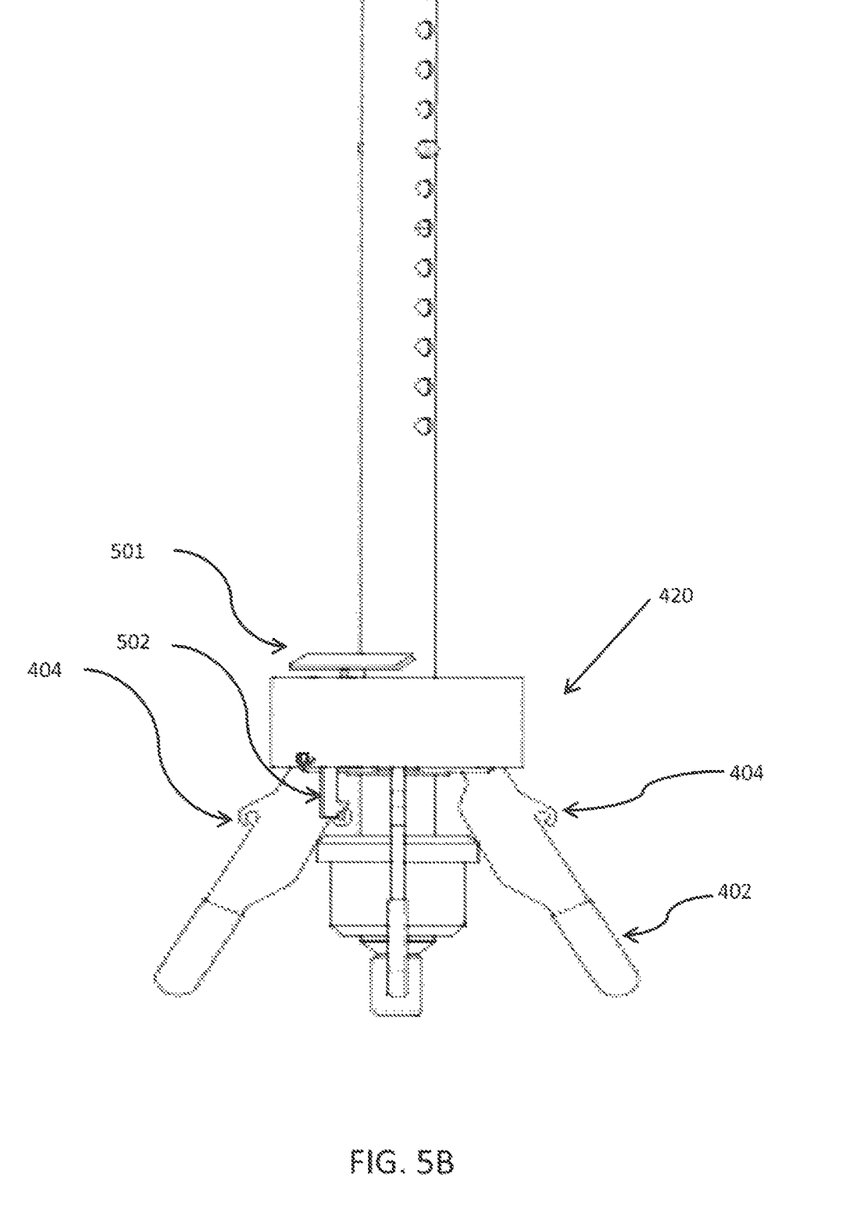
Figure 5C:
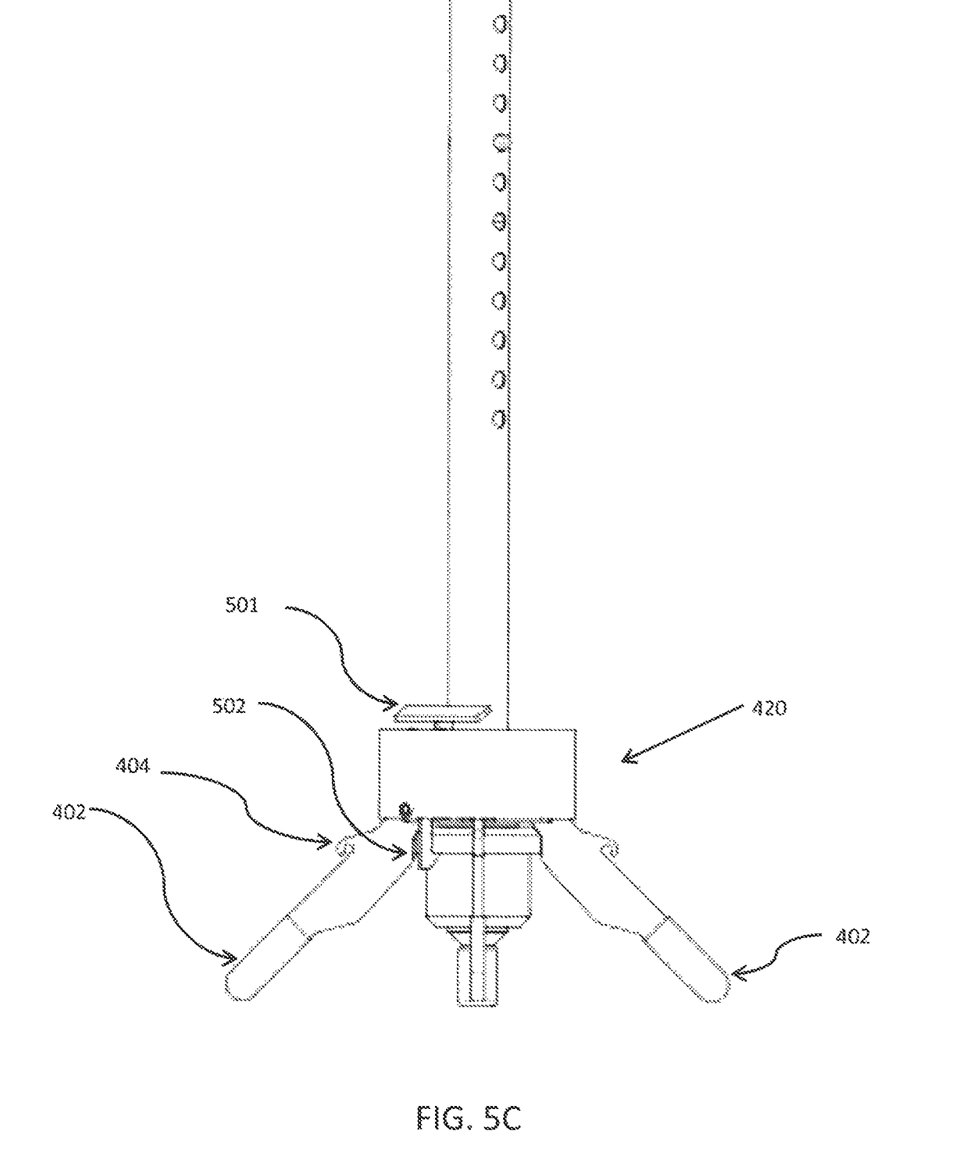

Furthermore, the spring mechanism 103 rests on the spring support mechanism 406. The spring support mechanism allows the spring mechanism 403 to be compressed against the spring support mechanism when the stabilizing section 420 is moved into the open position (FIG. 4B). In doing so, when the stabilizing section is unlocked, the spring mechanism 103 forces the stabilizing mechanism back into the closed position. In order to lock the stabilizing section 420 in the open position, a pedal mechanism 501 may be employed as shown in FIGS. 5A-5C. The pedal mechanism 501 is attached to a locking mechanism 502 which engages with an upper lip of the spring support mechanism 406 to hold the stabilizing section in an open position. FIG. 5A illustrates the stabilizing section 420 in an unlocked completely closed position.

Thus, as shown by these specific embodiments and the description provided above, the free-standing balancing apparatus of the present disclosure can be adjusted and configured to provide a wide variety of different types and degrees of stabilization for a user engaged in various types of activities. The handle arrangement, apparatus height, and stabilizer section choice can all be adjusted to suit people of all skill levels, ages, and physical stature, enabling a wide range of users to take advantage of activities that may otherwise be challenging and beyond their means. Such activities may include aerobic classes such as H.I.I.T. (high intensity interval training), kickboxing, boot camp, non-aerobic classes such as yoga, Pilates fusion, ballet bane, strengthening and conditioning classes, personal training, specialty classes for seniors, and physical therapy and rehabilitation, as well as others that would be apparent to one of ordinary skill in the art given the benefit of this disclosure.

The foregoing description of preferred embodiments of the present disclosure has been presented for the purposes of illustration and description. It is not intended to be exhaustive or to limit the disclosure to the precise form disclosed. Modifications and variations are possible in light of the above teachings, or may be acquired from practice of the disclosure. The embodiments were chosen and described in order to explain the underlying principles and their practical application to enable one skilled in the art to utilize the disclosure in various embodiments and with various modifications as are suited to the particular use contemplated. It is intended that the scope of the disclosure be defined by the claims appended hereto and their equivalents.

What is claimed is:

1. A free-standing balancing apparatus, comprising:
   a shaft body;
   a handle attached to the shaft body that is adjustable in height, wherein the handle is collapsible against sides of the shaft body; and
   a stabilizer section including:
      a spring mechanism disposed around a lower portion of the shaft body;
      a cap disposed around the shaft body, the cap movable along the shaft body due to a downward force on a surface of the cap by a user or by expansion of the spring mechanism;
      a pedal disposed on the surface of the cap;
      a locking mechanism attached to the pedal and extending downward into the cap, wherein the locking mechanism engages with the spring mechanism when the pedal is pressed;
      a plurality of stabilizers configured to be lowered and positioned into contact with a surface due to force on the surface of the cap and the plurality of stabilizers are locked via pressure to the pedal, wherein the plurality of stabilizers are individual or particular groupings of stabilizers, and the stabilizer section is adapted to enable the individual or the particular groupings of stabilizers to be positioned to provide varying levels of increased stability,
   wherein in a closed position, a portion of the plurality of stabilizers is inside the cap and in an open position the portion of the plurality of stabilizers is outside the cap.

2. The apparatus of claim 1, wherein the stabilizer section further includes:
   a spring support positioned to support the spring mechanism.

3. The apparatus of claim 1, the handle further comprising a first section and a second section, wherein the first section and the second section are independently collapsible.

4. The apparatus of claim 1, wherein a length of the shaft body is adjustable.

5. The apparatus of claim 1, wherein the shaft body includes a lower shaft segment and an upper shaft segment.

6. The apparatus of claim 5, wherein the stabilizer section is attached to the lower shaft segment.

7. The apparatus of claim 5, the stabilizer section further comprising:
   a plate movable along the lower shaft segment, wherein the plurality of stabilizers are fixedly attached to the plate, and the stabilizing section is adapted to be lowered as a complete unit to engage the plurality of stabilizers with the surface.

8. The apparatus of claim 5, the lower shaft segment further comprising a pin, wherein the upper shaft segment is inserted into the lower shaft segment at a selectable height via the pin.

9. The apparatus of claim 8, wherein the pin is depressible.

* * * * *